United States Patent Office 2,806,870
Patented Sept. 17, 1957

2,806,870

METHODS FOR STABILIZATION OF THE MANGANOUS SALT OF DIMETHYL DITHIOCARBAMIC ACID AND THE PRODUCTS THEREOF

Robert O. Beauchamp, Jr., College Park, Ga., assignor to Tennessee Corporation, New York, N. Y., a corporation of New York No Drawing. Application January 9, 1956,
Serial No. 557,832

4 Claims. (Cl. 260—429)

This invention relates to methods for stabilization of the manganous salt of dimethyl dithiocarbamic acid and the products thereof and more particularly to such methods for prevention of decomposition of the salts during storage and the resulting stabilized products.

It has heretofore been proposed to stabilize the manganous salt of dimethyl dithiocarbamic acid using various stabilizers and methods for adding such stabilizers to the salt have been proposed since it has been found that such stabilized salt is very effective in the control and prevention of growth of a wide variety of fungi and microbes.

Preparation of the metallic salts of dimethyl dithiocarbamic acids is described in U. S. Patent No. 1,972,961 and in the reissue patent thereof. In the file of U. S. Patent No. 2,504,404 the difficulties inherent in the dry manganous salt of dimethyl dithiocarbamic acid are described. The dry salt is known to be extremely unstable and subject to ignition on storage by spontaneous combustion rendering the salt wholly impractical because of the fire hazards involved in its manufacture, storage and use.

It therefore follows that an aqueous suspension of the manganous salt of dimethyl dithiocarbamic acid must be used to reduce fire hazard both during manufacture and storage. Aqueous suspensions have the additional advantage of easier preparation for spray mixtures. However, when the manganous salt of dimethyl dithiocarbamic acid is used in an aqueous suspension it is subject to rapid oxidative decomposition. Various stabilizers have been suggested for use with such suspensions and in particular inorganic sulphites have been suggested for this purpose in U. S. Patent No. 2,665,285. This patent proposes the use of sodium hyposulfite to stabilize the salt. This stabilizer works well enough when the suspension is kept in an air-tight container. When the suspension is open to the atmosphere sodium hyposulfite retards decomposition for approximately two days and then decomposition occurs rapidly.

Sodium sulfite has been used in place of sodium hyposulfite to stabilize the salt and exhibits the same properties in that when the suspension was exposed to the atmosphere the stabilizer was effective for approximately two days only.

I have found most unexpectedly that if from approximately 1 to 2% by weight of the manganous salt of dissolved thiourea is added to the aqueous suspension of the manganous salt of dimethyl dithiocarbamic acid that the aqueous suspension is stabilized and air-oxidation or darkening is inhibited for approximately two weeks even if the water which evaporates from the aqueous suspension is not replaced. If the aqueous suspension is maintained sealed from the atmosphere the suspension will remain light green in color with no apparent decomposition over extended periods of time. Under these conditions and at elevated temperatures of approximately 115° to 120° F. no decomposition was noted for periods as long as six weeks.

It is therefore the object of the present invention to provide methods for stabilizing the manganous salt of dimethyl dithiocarbamic acid by using thiourea as a stabilizer in a suspension of the salt and the resulting products of such methods.

Various methods may be used for the preparation of the aqueous suspensions of the manganous salt. U. S. Patent No. 2,662,841 describes such aqueous suspensions of the alkylene bis and the dialkyl dithiocarbamates. It is also known that various suspending agents may be used in these aqueous suspensions. The preparation of the aqueous suspension of the manganous salt and the use of suspending agents therein therefore form no part of my present invention.

Manganous dimethyl dithiocarbamate may be prepared by adding an aqueous solution of manganese sulfate to an aqueous solution of sodium dimethyl dithiocarbamate in known manner. The manganese salt may then be removed by filtration and the filter cake washed to obtain a resulting product of approximately 50% by weight of manganous dimethyl dithiocarbamate and 50% water. This product is completely reversible and may be redispersed in an aqueous medium by agitation and the use of 1% sulfolignin increases the rate of dispersion and retards the settling rate of the suspended particles. When 1 to 2% thiourea based on the weight of the manganous salt is added to this 50% aqueous suspension of manganous dimethyl dithiocarbamate decomposition thereof is inhibited for from ten days to two weeks when the suspension is left open and exposed to moderate temperatures and sunlight. If the suspension is sealed from the atmosphere decomposition is inhibited for an indefinite period.

The following table shows the results of fungitoxicity tests with the manganous salt in an aqueous suspension with and without thiourea when the samples thereof had been stored at room temperature (25–30° C.) in closed containers. The results in the table are expressed as the percentage germination of spores when a particular concentration of the fungicidal material is applied. Two test organisms were used. Sclerotinia fructicola is shown in the table by an asterisk and Curvularia lunata is shown in the table by a double asterisk.

| | Conc., p. p. m. | Percent Germination at p. p. m. | | | |
|---|---|---|---|---|---|
| | | 16 | 32 | 63 | 125 |
| Mn salt (50%) suspension | S* | 100 | 38 | 0 | 0 |
| Mn salt (50%) suspension + thiourea (1%) | C** | 100 | 100 | 0 | 0 |
| | S* | 100 | 25 | 0 | 0 |
| | C** | 100 | 42 | 0 | 0 |

It should now be apparent to those skilled in the art that by the present invention I have provided novel methods for the stabilization of the manganous salt of dimethyl dithiocarbamic acid using thiourea and resulting novel products which in every way satisfy the objects described above.

Changes in or modifications to this invention may now be suggested without departing from the present inventive concept. Reference should therefore be had to the appended claims to determine the scope of this invention.

What is claimed is:

1. In a method for stabilizing an aqueous suspension of the manganous salt of dimethyl dithiocarbamic acid, the step of adding to the aqueous suspension from 1 to 2% of thiourea based on the weight of the manganous salt.

2. A stabilized aqueous suspension of the manganous salt of dimethyl dithiocarbamic acid containing from 1 to 2% by weight of the manganous salt of thiourea.

3. An aqueous suspension of the manganous salt of dimethyl dithiocarbamic acid stabilized against darkening, decomposition and combustion containing stabilizing amounts of dissolved thiourea.

4. In a method for stabilizing the aqueous suspension of the manganous salt of dimethyl dithiocarbamic acid against darkening, decomposition and combustion, the step of adding to the suspension in stabilizing amounts dissolved thiourea.

No references cited.